Aug. 23, 1949.    W. J. MANGAN    2,479,849
LOCK BAR FOR BICYCLES
Filed April 30, 1948
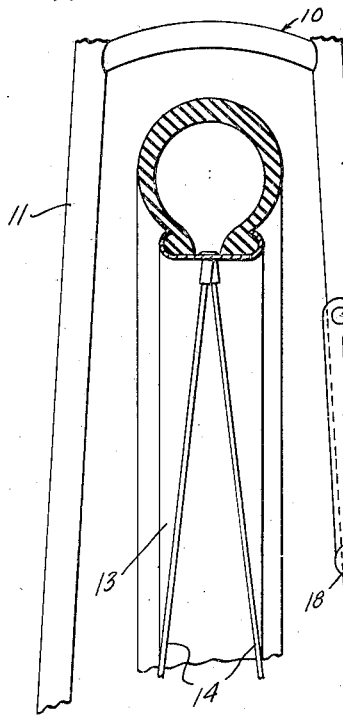
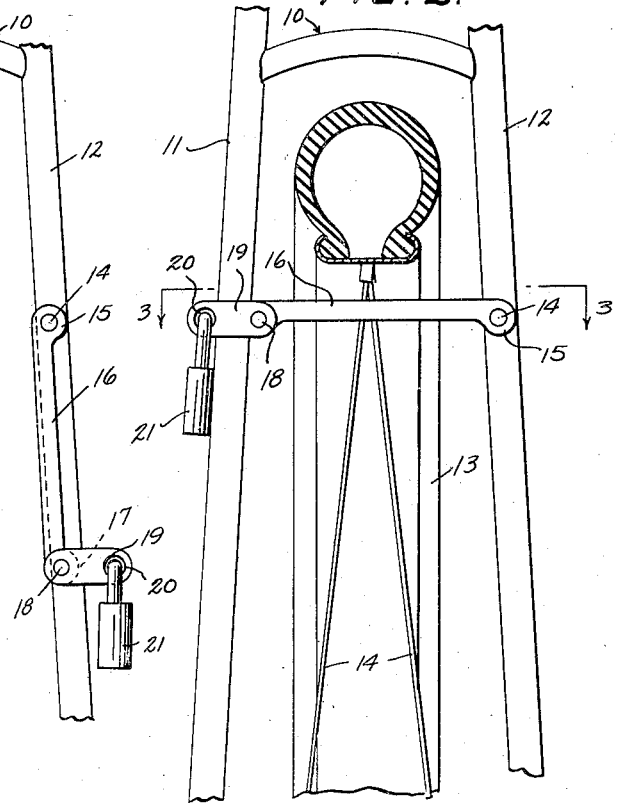
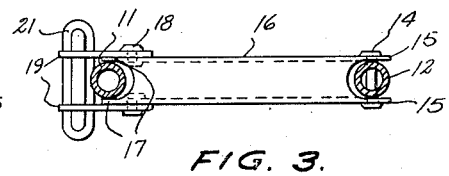
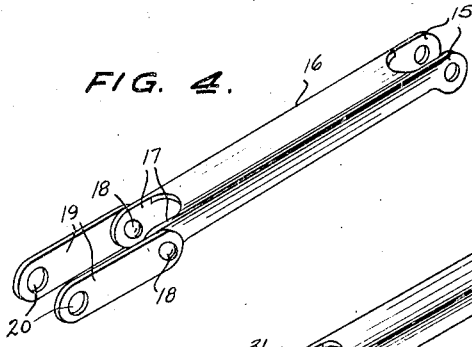
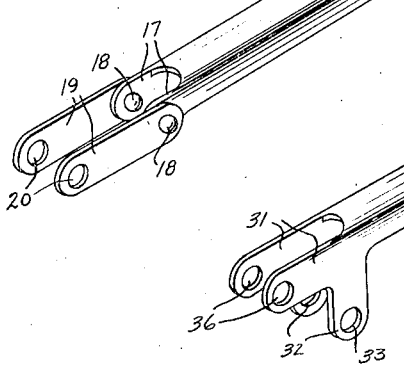
INVENTOR.
WILLIAM J. MANGAN,
BY
McMorrow, Berman & Davidson
ATTORNEYS.

Patented Aug. 23, 1949

2,479,849

UNITED STATES PATENT OFFICE 2,479,849

LOCK BAR FOR BICYCLES

William J. Mangan, Leavenworth, Kans.

Application April 30, 1948, Serial No. 24,317

5 Claims. (Cl. 70—227)

My invention relates to means for locking the wheels of a bicycle, and more particularly to a lock bar adapted to be interposed between the spokes of a bicycle wheel to lock the latter against rotation.

As is well known, most public buildings and office buildings will not admit bicycles to the ground floors thereof whereby bicycle users must park the bicycles on the sidewalk or elsewhere outside of the biulding. To prevent the bicycle from being stolen, it is customary to lock the wheels of the same by various devices, such as padlocks, chains or the like. However, such devices have the disadvantage that they are cumbersome and awkward to handle when the bicycle is in use and the locks are not applied thereto.

With the foregoing in view, it is an object of my invention to provide an improved lock bar for bicycles.

A further object is to provide an improved lock bar for bicycles which is hingedly connected to the leg of one of the wheel forks for swinging movement to and from an inoperative position alongside the leg to a lock-providing position extending through the wheel between the spokes thereof for engagement with the opposite leg of the fork.

A further object is to provide a lock bar for a bicycle such as that last described which includes a longitudinally-extending channel formed therein which is complementary to the leg of the wheel fork to which the bar is pivoted whereby the same snugly embraces such leg when the bar is in the inoperative position.

Other objects and advantages reside in the particular structure of the invention, combination and arrangement of the several parts thereof, and will readily be apparent to those skilled in the art upon reference to the following specification in connection with the attached drawing, wherein the invention is shown, described and claimed.

In the drawing:

Figure 1 is a fragmentary elevational view of one wheel fork of a bicycle showing the device according to the invention applied thereto, the bicycle wheel being shown in transverse vertical section fragmentarily;

Figure 2 is a view like Figure 1, but showing the lock bar in the lock-providing position;

Figure 3 is a horizontal sectional view taken substantially on the plane of the line 3—3 of Figure 2;

Figure 4 is a perspective view of the lock bar of Figure 1 apart from the rest of the structure;

Figure 5 is a view like Figure 4, but showing a modified form of lock bar.

Referring specifically to the drawing, and more particularly to Figures 1 to 4, inclusive, and wherein like reference characters have been used throughout the several views to designate like parts, 10 designates generally a front or rear wheel fork of a bicycle which includes the usual legs 11 and 12 on either side of the wheel 13, the latter being provided with the usual spokes 14. As so far described, the structure is conventional and forms no part of my invention.

The lock bar according to this form of the invention comprises a bar-providing portion 16 of channel configuration, the channel of which is complementary to the contour of the leg 12, whereby when the same is in the inoperative position, Figure 1, the bar 11 closely embraces the leg. The upper end 15 of the bar 16 provides bifurcated ears which are suitably apertured and hingedly supported on the leg 12 by means of any suitable hinge-providing pin 14 extending through said leg. The opposite end of the bar 15 is likewise provided with spaced ears 17 to which is hingedly connected by means of rivets or a transverse pin 18 a bifurcated member comprising a pair of links 19. The free ends of the links 19 are apertured to provide aligned apertures 20 which are adapted to straddle the leg 11 when the bar 16 is in the lock-providing position, Figure 2, and such apertures receive the hasp of a padlock or other lock-providing means 21. In this connection, it should be understood that any suitable means for locking the bar 16 in either the inoperative or the operative positions may be used. Figure 1 shows the device in the inoperative position with the bar channel closely embracing the leg 12 and with the links 19 laterally outwardly directed and with the padlock 21 applied thereto, whereby the bar 16 is maintained in the inoperative position.

In the form of invention disclosed by Figure 5, a channeled lock bar 30 having a channel complementary to the leg 12 is pivoted thereto by any suitable pin, not shown, extending through the upper bifurcated ears 35 which are provided with aligned apertures 34 for this purpose. The opposite end of the bar 30 is provided with integral and rigidly-formed bifurcated ears 31 which are substantially longer than the corresponding ears 17 of the first-described form. Such ears straddle the opposite leg 11 when the bar is in the lock-providing position. Such ears 31 are provided with aligned apertures 36 to receive a suitable lock-providing means, such as the padlock 21. In addition, this end of the bar 30 is provided with a pair of rigid integral and laterally-extending ears 32 which are likewise provided with aligned apertures 33. Such ears 32 are adapted to straddle the pivot-providing leg 12 when the bar is in the inoperative position and the apertures 33 thereof are adapted to receive the hasp of a padlock or other lock-providing means whereby to maintain the same in the inoperative position.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a bicycle including a wheel fork having a pair of laterally-spaced fork-providing legs, a lock bar pivoted to one leg and swingable to and from an inoperative position alongside said leg and a lock-providing position spanning said legs, the improvement comprising said lock bar being formed with a longitudinally-extending channel therein, said channel being complementary to said leg to which said bar is pivoted and adapted to embrace said leg when said lock bar is in said inoperative position, said lock bar including a free end having means adapted for engagement with a padlock for locking said bar to a fork-providing leg in both said operative position and said inoperative position.

2. In a bicycle including a wheel fork having a pair of laterally-spaced fork-providing legs, a lock bar pivoted to one leg and swingable to and from an inoperative position alongside said leg and a lock-providing position spanning said legs, the improvement comprising said lock bar being formed with a longitudinally-extending channel therein, said channel being complementary to said leg to which said bar is pivoted and adapted to embrace said leg when said lock bar is in said inoperative position, said lock bar including a free end, a member providing bifurcations carried by said free end, said bifurcations being adapted to straddle said last-named leg when said bar is in said inoperative position, and said bifurcations being adapted to straddle the other leg when said bar is in the lock-providing position.

3. In a bicycle including a wheel fork having a pair of laterally-spaced fork-providing legs, a lock bar pivoted to one leg and swingable to and from an inoperative position alongside said leg and a lock-providing position spanning said legs, the improvement comprising said lock bar being formed with a longitudinally-extending channel therein, said channel being complementary to said leg to which said bar is pivoted and adapted to embrace said leg when said lock bar is in said inoperative position, said lock bar including a free end, a member providing bifurcations, means pivotally connecting said member to said free end, said bifurcations being adapted to straddle said last-named leg when said bar is in said inoperative position, and said bifurcations being adapted to straddle the other leg when said bar is in the lock-providing position.

4. In a bicycle including a wheel fork having a pair of laterally-spaced fork-providing legs, a lock bar pivoted to one leg and swingable to and from an inoperative position alongside said leg and a lock-providing position spanning said legs, the improvement comprising said lock bar being formed with a longitudinally-extending channel therein, said channel being complementary to said leg to which said bar is pivoted and adapted to embrace said leg when said lock bar is in said operative position, said lock bar including a free end, a member providing bifurcations integral with said free end, said bifurcations being adapted to straddle said last-named leg when said bar is in said inoperative position, and said bifurcations being adapted to straddle the other leg when said bar is in the lock-providing position.

5. In a bicycle including a wheel fork having a pair of laterally-spaced fork-providing legs, a lock bar pivoted to one leg and swingable to and from an inoperative position alongside said leg and a lock-providing position spanning said legs, the improvement comprising said lock bar being formed with a longitudinally-extending channel therein, said channel being complementary to said leg to which said bar is pivoted and adapted to embrace said leg when said lock bar is in said inoperative position, said lock bar including a free end, said free end being formed with integral laterally-extending bifurcations adapted to straddle said last-named leg when said bar is in said inoperative position, and said free end being formed with integral longitudinally-extending bifurcations adapted to straddle the other leg when said bar is in said lock-providing position.

WILLIAM J. MANGAN.

REFERENCES CITED

The following references are of record in the file of this patent:

UNITED STATES PATENTS

| Number | Name | Date |
|--------|------|------|
| 1,402,725 | Pippen | Jan. 3, 1922 |
| 1,654,017 | Schlener | Dec. 27, 1927 |